A. R. MOORE.
VEHICLE WHEEL OR RUNNER.
APPLICATION FILED APR. 10, 1913.
1,101,316.
Patented June 23, 1914.
3 SHEETS—SHEET 1.
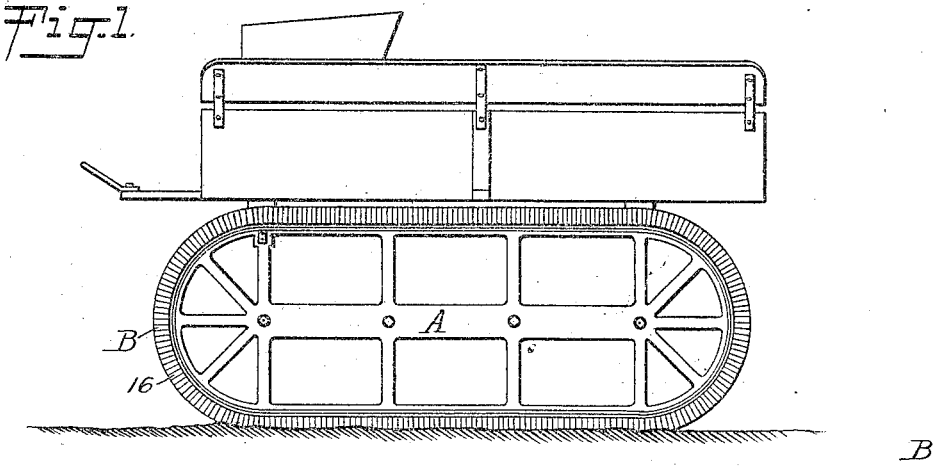
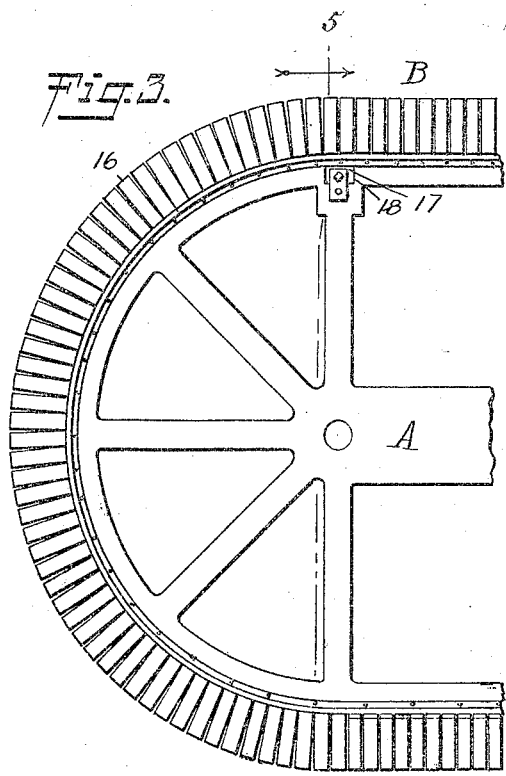
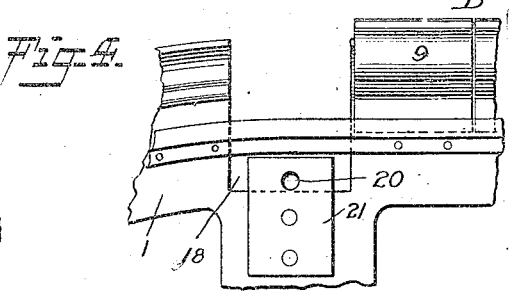
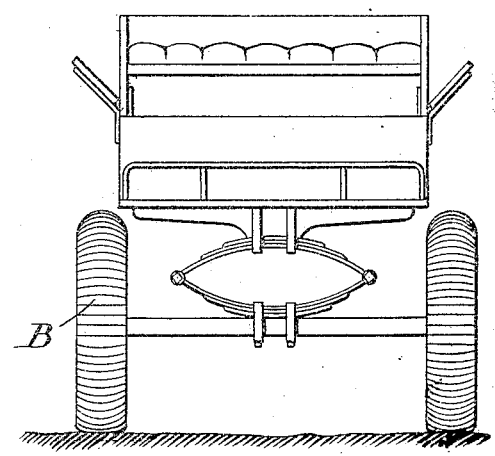
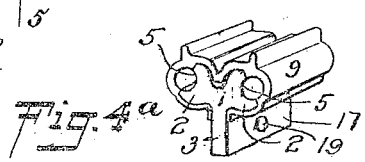
WITNESSES
William P. Goebel
C. Brodway
INVENTOR
Allen R. Moore
BY
ATTORNEYS

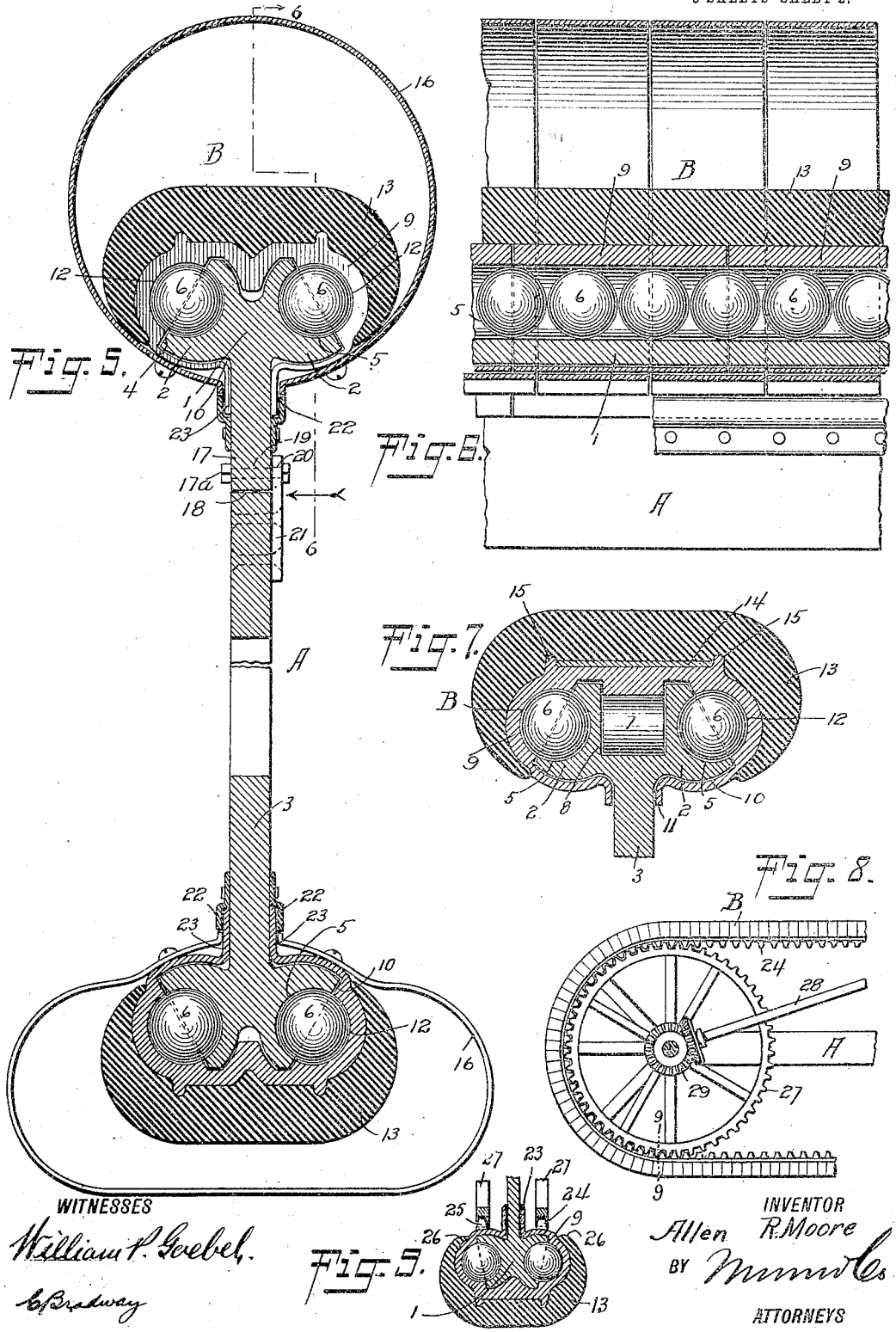

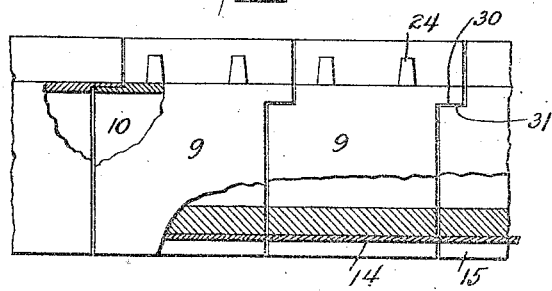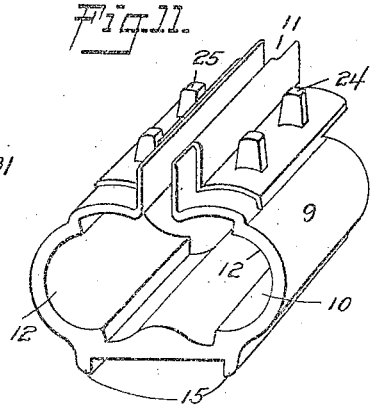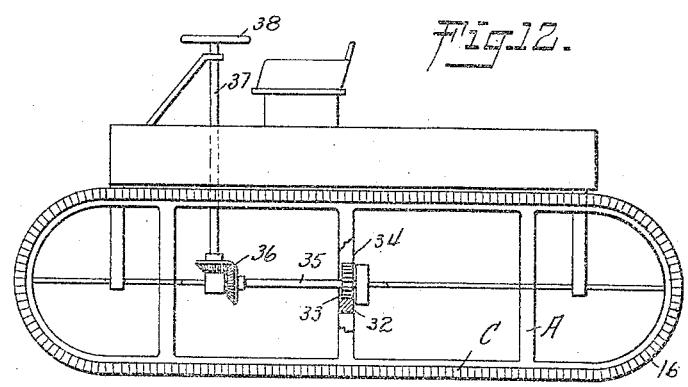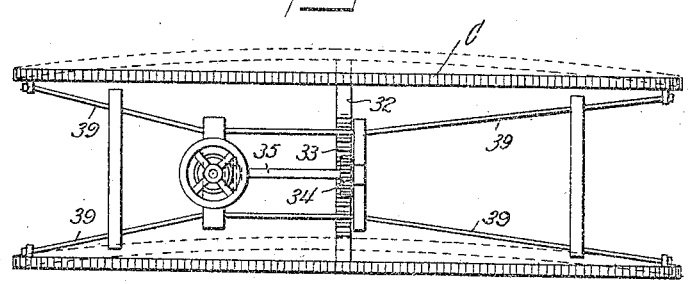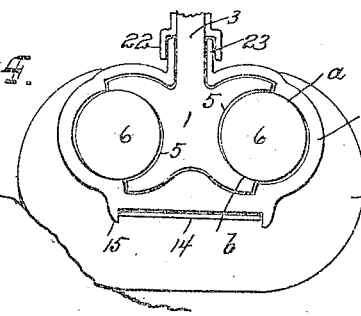

UNITED STATES PATENT OFFICE.

ALLEN R. MOORE, OF MOUNT VERNON, WASHINGTON.

VEHICLE WHEEL OR RUNNER.

1,101,316.

Specification of Letters Patent. Patented June 23, 1914.

Application filed April 10, 1913. Serial No. 760,171.

*To all whom it may concern:*

Be it known that I, ALLEN R. MOORE, a citizen of the United States, and a resident of Mount Vernon, in the county of Skagit and State of Washington, have invented a new and Improved Vehicle Wheel or Runner, of which the following is a full, clear, and exact description.

This invention relates to vehicles, and more particularly to elliptical wheels or runners of that type in which the tread consists of an endless element which travels around the inner frame or fixed section of the runner.

The invention has for one of its objects to improve the construction of traction devices of the character referred to so as to be of durable and substantial design, capable of operating with a minimum of friction, and at the same time providing resiliency, so that easy and smooth running of the vehicle is insured.

Another object of the invention is the provision of a novel endless tread element which travels on the elliptical track of the inner fixed section of the runner, there being anti-friction devices between the outer tread element and inner fixed element.

A further object is the provision of a tread element composed of sections assembled on the inner frame element in combination with a rubber tire or casing which covers the said sections.

Another object is the employment of a plurality of circular springs extending transversely and forming the exterior of the tread element to give resiliency thereto and enable a firm grip to be obtained on the road surface.

An additional object is to provide simple and effective means for driving the tire element for the propulsion of the vehicle.

Another object is the provision of flexible runners which can be simultaneously flexed in one direction or the other to impart a curvature to each runner, whereby the vehicle can be steered, said flexible runners being useful in short vehicles, whereas in long vehicles a plurality of sets of runners may be employed, with one set movably mounted on the body of the vehicle for the purpose of steering.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate certain embodiments of the invention, and wherein similar reference characters are employed to designate corresponding parts throughout the several views, Figure 1 is a side view of the vehicle provided with the improved runners; Fig. 2 is a front view of the vehicle; Fig. 3 is an enlarged view of one end of the runner; Fig. 4 is a fragmentary view of the runner to show the manner of assembling the sections of the tread element; Fig. 4ª is a perspective view of the key or member of the fixed element of the runner that locks the sections of the tread element in place; Fig. 5 is an enlarged sectional view on the line 5—5 of Fig. 3; Fig. 6 is a sectional view on the line 6—6 of Fig. 5, drawn on an enlarged scale; Fig. 7 is a detail transverse section showing a modified form of tread or tire element; Fig. 8 is a side view of one end of a runner provided with means for driving the tread or tire element; Fig. 9 is a transverse sectional view on the line 9—9 of Fig. 8; Fig. 10 is a fragmentary view showing the overlapping relation of adjacent sections that constitute the body of the tire element; Fig. 11 is a perspective view of one of the sections shown in Fig. 10; Figs. 12 and 13 are side and plan views of runners that are laterally flexible in the center; and Fig. 14 is a diagrammatic view showing the shifting of the lines of thrust between the outer tread and inner frame element when the runner passes over laterally sloping surfaces.

Referring to the drawings, A designates the inner frame or body element of the runner and B the tread or tire element, which latter travels around the periphery of the frame element A by its lower portion being in contact with the road when the vehicle is drawn, or by power being applied to the tire element when the vehicle is propelled by an engine or other prime mover located on the vehicle.

The frame A is elongated horizontally and has semi-circular ends, so that in outline, as shown in Fig. 1, the runner is approximately elliptical. The periphery of the frame A comprises a track 1, which, as shown in Fig. 5, consists of laterally-extending flanges 2 projecting from the opposite sides of the body portion 3 of the inner section or frame of the runner, and the side faces 4 of the flanges 2, which constitute the track for the tread element, slope toward each other and converge outwardly so that the track 1 is in cross-section approximately like the frustum of an equilateral triangle. In these laterally sloping surfaces 4 are grooves 5 of semi-circular cross-section for receiving antifriction bearing balls 6, there being a continuous elliptical race of balls 6 extending entirely around the periphery of the frame element A at both sides.

For comparatively light vehicles the arrangement shown in Figs. 5 and 9 is employed, whereas in heavy vehicles, bearing rollers 7 are mounted in the track or peripheral portion of the inner section or frame A of the runner, such rollers 7 being disposed in a groove 8 disposed between the ball grooves 5, and on these rollers 7 the tire or tread element B travels. The tread element B comprises a body made up of metal sections 9, which in transverse section are of such shape as to correspond to the contour of the peripheral or track portion 1 of the inner section A of the runner. In other words, each section 9 is a block provided with a chamber 10 having a slot 11, so as to embrace the track 1. The chamber 10 is formed with grooves 12 at opposite sides, so as to receive the bearing balls 6. The grooves 12 of the various sections aline, so as to form a continuous race for the bearing balls. Covering all the sections is a rubber envelop or sheath 13, which prevents water from entering between the tread and frame elements of the runner. Interposed between this rubber sheath and the sections 9 may be arranged a continuous strip 14 of metal or other material which covers the joints between the adjacent sections, so that wear on the rubber will not result at such joints. This joint covering strip 14 is set in between spaced ribs 15 extending longitudinally of the sections 9. The rubber sheath or cover 13 may be employed as in Figs. 8 and 9, to constitute the outer surface of the tire element, but if desired the exterior of the tire element may consist of circular rings 16 of steel or other metal disposed in transverse relation to the axis of the tread element and inclosing the sections 9 and the rubber portion 13. These rings are suitably secured to the tire element to move therewith, and when weight is brought to bear upon them they flatten out more or less in the manner shown at the bottom of Fig. 5.

For the purpose of assembling the sections 9 of the tire element B of the track of the inner fixed element A, a portion 17, Fig. 4ª, is removable from a recess 18 in the track 1. This section 17 forms a key for locking the sections 9 on the inner element A of the runner. When the key or removable portion 17 of the track 1 is removed, the sections 9 are placed in the recess with their chambers in alinement with the track 1, and then by a lateral movement they can be slipped on the latter. The final section 9 is assembled on the key or removable part 17 as shown in Fig. 4ª, and these two parts as a unit are placed in the recess 18 and fastened therein by a bolt or equivalent means 17ª passing through the openings 19 in the part 17 and 20 in the plate 21. On the frame of the runner mud guards 22, Fig. 5, are applied to opposite sides of the frame A, in overlapping relation to the flanges 23 on the sections 9 of the tread element.

When the tread element is to be positively driven, as when the runners are used for automobiles, the sections 9 of the tread element are provided with two sets of gear teeth 24 and 25 on the inner portions between the flanges 23 and the edges 26 of the sheath 13, and on the ends of the frame A are mounted two gear wheels 27 which are of substantially the same diameter as the circular ends of the runner, in order that half of each gear wheel will be in mesh with the tire element. These gear wheels 27 are driven in any suitable manner, as, for instance, by shafts 28, Fig. 8, connected by a gearing 29 with each gear wheel 27.

In Figs. 10 and 11 are shown modifications of the sections 9 forming the body of the tread element, the modification residing in the overlapping portions 30 and 31 of adjacent sections, so as to provide more effectively against the entrance of dirt or dust into the tread element.

In vehicles that are comparatively short the runners C, Figs. 12 and 13, are flexible, so as to be bowed laterally at their centers, as indicated by dotted lines in Fig. 13. The frames A' are in this instance made of flexible sheet metal, or they may be made of laminations so as to be flexible. These runners are rigidly connected together at their middle by a cross bar 32 or equivalent means which is provided with rack teeth 33 with which meshes a pinion 34, the pinion being secured to a shaft 35 connected by gearing 36 to the steering post 37. By turning the steering wheel 38 the runners can be flexed laterally to one side or the other in order to give a curvature to the runners for the purpose of steering or turning. Suitable braces 39 are provided between the runners for holding the ends thereof in fixed relation.

Referring to the diagram shown in Fig. 14, it will be observed that a shift in the line of thrust between the elements A and B of the runner takes place when the runner passes over a sloping surface. Normally, or when passing over an even surface, both balls 6 bear at the top on the track 1 and bear at the bottom on the section 9 of the tire, but when the road surface is sloping, as in Fig. 14, the point of contact between the balls shifts, the ball at the right having its top in contact with the section 9 and its bottom in contact with the track, so that lateral thrusts or thrusts intermediate the vertical and horizontal are effectively taken care of.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof I desire to have it understood that the apparatus shown is merely illustrative, and that such changes may be made when desired as are within the scope of the appended claims.

Having thus described my invention, I claim as new and desire to secure by Letters Patent:

1. A runner of the class described comprising an inner frame section having a peripheral track, the external side faces of the track being sloping and provided with grooves, a tread element made up of sections slidably mounted on the track and having grooves matching the grooves of the track to form therewith ball races, balls disposed in the said races, said track having a continuous groove in its periphery, rollers mounted in the said groove and freely movable therein, and means on the sections of the tread element having a bearing engagement with the said rollers.

2. A runner of the class described comprising an inner frame section provided with a peripheral track, a tread element traveling around the track and composed of metal sections and embracing the track, and a continuous flexible resilient sheath covering carried by the said sections.

3. A runner of the class described comprising an inner frame section provided with a peripheral track, a tread element traveling around the track and composed of metal sections transversely embracing the track and adjacent sections having their juxtaposed ends overlapping, a continuous flexible resilient sheath covering carried by the said sections, and approximately circular springs surrounding the said sheath in transverse relation thereto and movable with the said sections to form the outer or road-engaging part of the tread element for imparting resiliency thereto.

4. A runner of the class described comprising an inner fixed section having a peripheral track and an endless tread element traveling around the track and consisting of a plurality of sectional portions arranged end to end and slidably mounted on the track, a band extending over the sections to bridge the joints between them, and a resilient sheath inclosing the sections and band.

In testimony whereof I have signed my name to this specification in the presence of two subscribing witnesses.

ALLEN R. MOORE.

Witnesses:
 JOHN M. LINDBLOOM,
 S. G. BALL.